Figure 1:
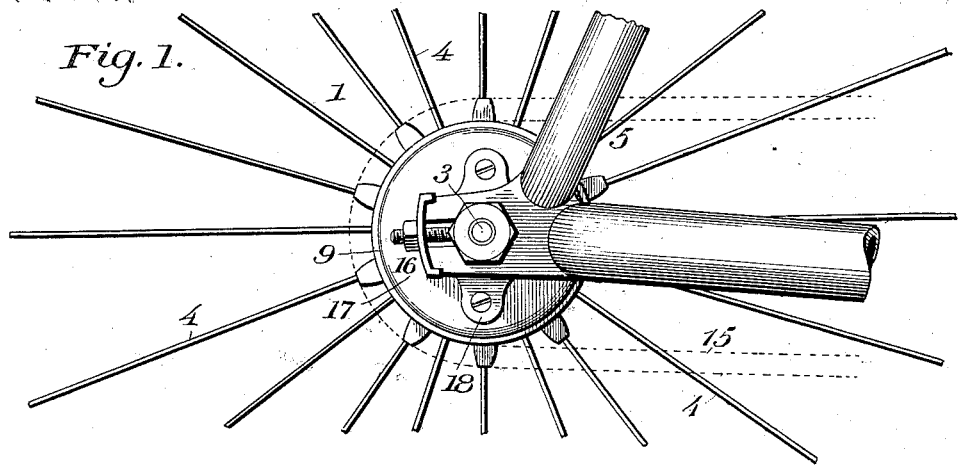

No. 656,788. Patented Aug. 28, 1900.
W. E. HENRY.
BACK PEDALING BRAKE.
(Application filed Aug. 10, 1898.)

(No Model.) 2 Sheets—Sheet 1.

Witnesses.
Louis G. Julihn
Adolph A. Koch

Inventor.
William Earl Henry
By W. S. Boyd
Atty.

THE NORRIS PETERS CO., PHOTO-LITHO., WASHINGTON, D. C.

No. 656,788. Patented Aug. 28, 1900.
W. E. HENRY.
BACK PEDALING BRAKE.
(Application filed Aug. 10, 1898.)
(No Model.) 2 Sheets—Sheet 2.
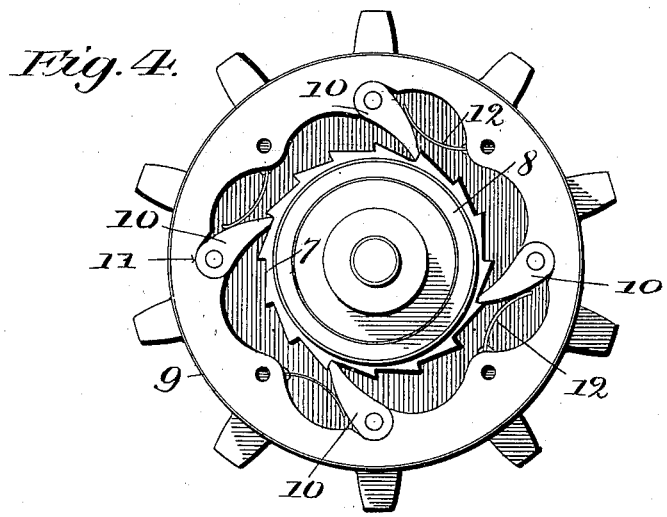
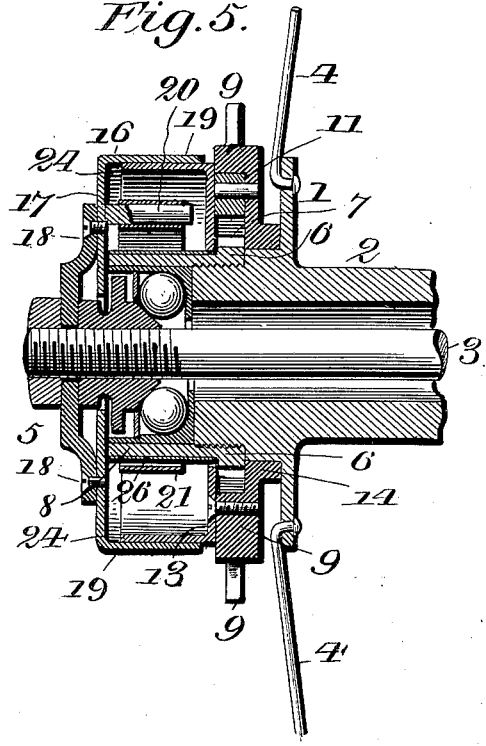
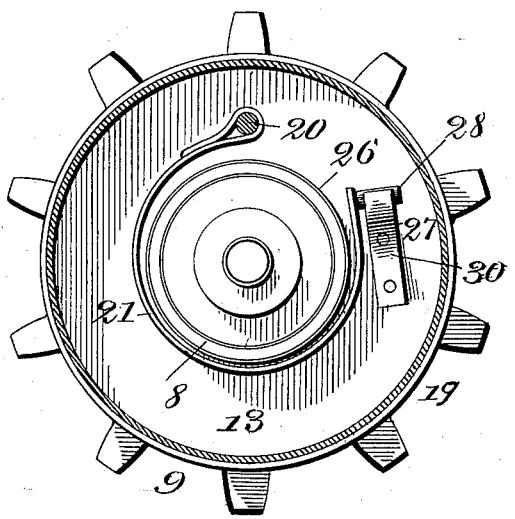
Witnesses
L. C. Hills.
Louis G. Julihn.
Inventor
William Earl Henry
By W. S. Boyd
Attorney
THE NORRIS PETERS CO., PHOTO-LITHO., WASHINGTON, D. C.

UNITED STATES PATENT OFFICE.

WILLIAM EARL HENRY, OF WASHINGTON, DISTRICT OF COLUMBIA, ASSIGNOR TO CHARLES M. CAMPBELL, OF SAME PLACE.

BACK-PEDALING BRAKE.

SPECIFICATION forming part of Letters Patent No. 656,788, dated August 28, 1900.

Application filed August 10, 1898. Serial No. 688,745. (No model.)

*To all whom it may concern:*

Be it known that I, WILLIAM EARL HENRY, a citizen of the United States, residing at Washington, District of Columbia, have invented certain new and useful Improvements in Brakes; and I do hereby declare the following to be a full, clear, and exact description of the invention, such as will enable others skilled in the art to which it appertains to make and use the same.

My invention relates to an improved brake of the type designated as "back-pedaling" brakes for bicycles.

One object of my invention is to provide a simple and inexpensive yet highly efficient brake having its coöperative parts so organized and arranged that the pedals or other connected driving mechanism will be automatically connected to the driven element when operated in one direction, will be automatically disconnected from said element when at rest to permit coasting, and will automatically actuate retarding or brake mechanism when operated in the opposite direction, the extent of the application of the brake to the driven element—as, for instance, the rear wheel of a bicycle—being determined by the amount of pressure exerted during the operation of back-pedaling. In addition to these primary objects a secondary object of the invention is the application of the braking or retarding mechanism at or adjacent to the axis of the driven element, which peculiarity results in economy of manufacture and in the application of the retarding power at a point where the liability of wear incident to its frictional arrangement is reduced to a minimum as contradistinguished from the application of the brake to the tire or other comparatively fragile or destructible part.

To the accomplishment of these and other objects, my invention consists in mounting a power-transmitting gear-wheel upon the hub of the rear wheel of a bicycle and in effecting the automatic engagement and disengagement of these elements through the interposition of pawl-and-ratchet mechanism, so disposed relatively that the forward rotation of the sprocket will cause the synchronous rotation of the hub, while permitting the independent forward rotation of the latter when the sprocket is held at rest or is rotated in the reverse direction, or, in fact, when said sprocket or power-transmitting gear is rotated in a forward direction at a comparatively-low rate of speed. In operative relation to the hub or to an element carried thereby is mounted a retarding device—as, for instance, a brake-strap or its equivalent— arranged in a manner to be engaged and operated only through the reverse or rearward rotation of the sprocket, the automatic engagement and disengagement of the sprocket or driving element and the brake-band or retarding element being effected by a simple and ingenious detail of construction and arrangement to be hereinafter made more clearly apparent.

The invention consists, specifically, in the detailed construction and arrangement of parts hereinafter fully described, and succinctly pointed out in the appended claims.

Figure 2:
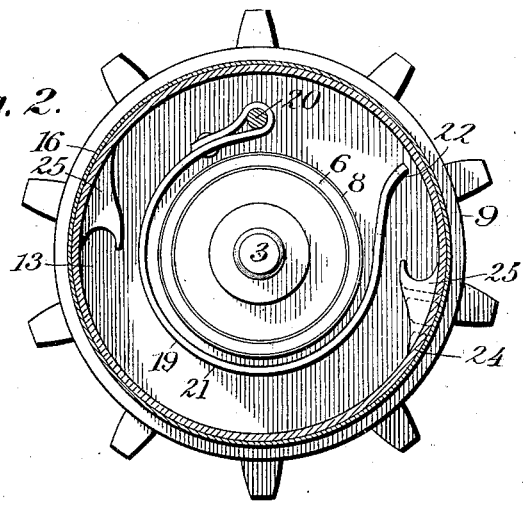
Figure 3:
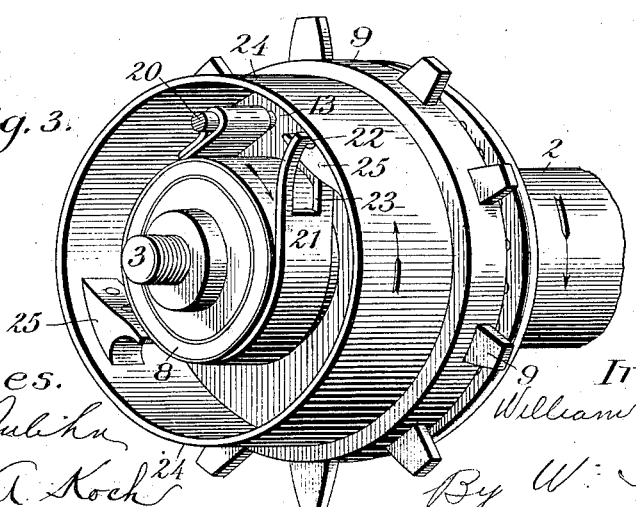

Referring to the accompanying drawings, Figure 1 is a side elevation of a portion of the rear wheel of a bicycle with my brake attached. Fig. 2 is a perspective view showing a portion of the frame and the dust-case removed, the parts being shown in the position occupied by them when the sprocket is being driven forward to transmit power to the rear wheel of the bicycle or other driven element. Fig. 3 is a view similar to Fig. 2, with the parts in position to apply the brake, it being understood that in this position of parts the bicycle-wheel is traveling forward in the direction indicated by the arrow thereon and the rear sprocket-wheel being operated in the reverse direction under the impulse of back-pedaling, as indicated by the smaller arrow. Fig. 4 is a perspective view showing the brake-band and the face-plate of the sprocket removed for the purpose of more clearly illustrating the pawl-and-ratchet mechanism. Fig. 5 is a central longitudinal section through the hub and brake, and Fig. 6 is an elevation of a modified form of the invention comprising a laterally-disposed lug carried by the sprocket-wheel and designed to engage a radially-disposed pin extending from the free extremity of the brake-band.

Referring to the numerals of reference on the drawings, 1 indicates a portion of the rear wheel of a bicycle or other vehicle comprising a central hub 2, mounted preferably in ball-bearings on the transverse shaft 3 and supporting in the usual manner a series of radial spokes 4. The extremeties of the shaft 3 are secured, as usual, at the lower extremities of the rear braces 5 of the wheel-frame, only such portions of the wheel-frame as are necessary to the understanding of the application having been illustrated in the accompanying drawings.

6 indicates a collar made integral with or secured upon the hub adjacent to one extremity and provided adjacent to one edge with a series of ratchet-teeth 7, the plain portion 8 of the collar constituting what may be termed a "friction-drum," designed in the manner hereinafter to be made apparent to receive the frictional contact of the brake-band.

9 indicates a power-transmitting gear-wheel which in this instance is a sprocket-gear mounted upon the hub against the inner end of the collar 6. The outer face of the wheel 9 is dished or recessed for the reception of one or more pawls 10, pivoted within the concave face of the sprocket and having their pivoted ends pivoted within the pawl-recesses 11, which provide an extended bearing therefor. The pawls 10 are forwardly directed to positively engage the rearwardly-disposed ratchet-teeth 7 and are yieldingly urged into engagement therewith by springs 12 of any desired form.

13 indicates the annular face-plate of the sprocket, secured thereto in any suitable manner—as, for instance, by screw-bolts illustrated and designed to cover and protect the several pawls carried by the sprocket and to constitute an outer bearing for the latter. It will be noted that the rear wall 14 of the sprocket travels upon the wheel-hub and that the face-plate 13 travels upon the collar 6 adjacent to the one end of the ratchet-teeth formed thereon, serving to prevent lateral displacement of the sprocket-wheel, while permitting its free rotation in either direction. It will now be apparent that when the wheel 9 is rotated in a forward direction under the impulse of the sprocket-chain 15, operatively connected to the driving mechanism proper—as, for instance, the driving-sprocket carried by the crank-shaft, (not illustrated,)—the pawls 10 will engage the teeth 7 upon the collar 6 and will establish a positive connection between the driving element or power-transmitting wheel 9 and the driven element or hub 2 of the bicycle or other vehicle wheel. In like manner when the wheel 9 is rotated in the opposite direction the pawls will ride upon the inclined face of the ratchet-teeth against the resistance of their springs, thus breaking the connection between the wheel 9 and the hub and permitting their independent rotation in opposite directions or in the forward direction at different speeds. It will therefore be seen that while the vehicle may be driven by the rotation of the pedals in a forward direction the act of back-pedaling will automatically release the vehicle from operative connection with the driving mechanism and the rider may coast by simply holding the pedals at rest.

I shall now proceed to describe the novel retarding or brake mechanism which may be applied to the driven element or wheel-hub by exerting back-pressure upon the pedals, or, in other words, by back-pedaling.

16 indicates a dust-case comprising a disk 17, concentric with the shaft 3 and secured by any suitable means—as, for instance, a clamp-collar 18, a bolt, or the like—to the inner face of the bicycle-frame at the point of its connection with the rear-wheel shaft. Extending laterally from the periphery of the disk 17 is an annular sand-band or flange 19, which extends quite or nearly to the face-plate of the sprocket, the purpose of this band being to exclude sand and other foreign substances from the working parts of the device.

20 indicates a stud extending inwardly from the face of the disk 17 adjacent to the periphery of the collar 6, to which stud is secured in any approved manner one end of the friction-band 21, which partly or wholly encircles the plain portion of the collar 6 (which has been designated a "friction-drum") and terminates in the slightly-upturned end 22. In the claims I shall refer to a brake element arranged to be urged into contact with the face of the hub. The face of the hub may, however, for the purpose of this invention be either the hub proper or a drum, collar, band, or other wear-surface mounted thereon. The friction-band 21 is provided in its free end with a longitudinal slot or aperture 23, which terminates in the upturned end, so that the outer extremity of the slot is in a slightly-higher plane than the body of the friction-band.

24 indicates an annular flange extending from the periphery and preferably integral with the face-plate 13 of the wheel 9 and fitting snugly within the annular flange of the dust-case, the union of these oppositely-disposed flanges serving to obscure and protect the inclosed brake mechanism. The free extremity of the brake-band 21 is designed to be engaged (when the wheel 9 is driven rearwardly) by the lug or catch 25, extending inwardly from the flange 24 in lateral alinement with the slot 23. Inasmuch as it is desired that the catch shall engage the brake-band only when driven in one direction, the rear face of the lug is radial with respect to the axis of the shaft and its forward face is gradually inclined from the lower extremity of the rear face to the face of the annular flange 24. The form of catch is not essential, however, since it is obvious that it might be in the form of a hook, for instance, the only essential feature being such design as will cause the catch to engage the brake-band in one direction and avoid engagement therewith when its direction of movement is reversed. It will now be observed that when the wheel 9 is urged in a forward direction its pawls will engage the teeth carried by the wheel-hub and the vehicle will be propelled, the catch 25 traveling above the surface of the friction-band and its inclined face passing over and depressing the free extremity of the said band without engaging therewith. Supposing now that the operator (in this instance a bicyclist) should allow the power-transmitting wheel 9 to remain at rest, the vehicle-wheel will continue its forward rotation independently, the wheel 9 and the brake mechanism being negative elements. The rider may now coast indefinitely, but with the wheel under constant control. If now it is desired to reduce the speed of the vehicle or to bring it to a standstill, it is simply necessary to reverse the direction of the rotation of the wheel 9, as, for instance, by back-pedaling. The catch 25 will now travel upon the brake-band with its radial face in advance, and as soon as it comes opposite the slot 23 in the band the free extremity of the latter will spring upward, causing the catch to pass through the slot and effecting an engagement between the rear face of the catch and the upturned extremity of the brake-band, the face of the catch being preferably concave for the purpose of insuring this connection. Continued rearward or reverse movement of the sprocket will cause the brake-band to be brought into frictional contact with the frictional drum carried by the wheel-hub, the power of the brake being proportionate to the pressure exerted in the operation of back-pedaling.

If desired, a frictional facing 26—as, for instance, of leather, rubber, or the like—may be imposed upon the face of the drum or upon the contiguous face of the brake-band; but this is a matter of expedient and is not considered essential to the operation of my device.

In Fig. 6 I have illustrated a modification of my invention identical in most respects with the preferred form, variation being that instead of employing the annular flange 24, the catch 25, and the slotted brake-band I mount a catch or lug 27 upon the face-plate 13 of the gear 9 and designed to engage a pin 28, extending radially from the extremity of the brake-band, one face 30 of the catch being inclined, so that when the wheel 9 is rotated forwardly the pin upon the brake-band will be urged laterally and will pass the catch without engaging therewith, reverse movement of the wheel serving to bring the straight face of the catch into engagement with the pin and effecting the application of the brake in a manner analogous to the operation heretofore described.

While the present embodiment of my invention appears at this time to be preferable, I do not desire to limit myself to the structural details illustrated and described, as it is obvious that many modifications and structural variations suggested by experience and experiment may be adopted without departing from the spirit of the invention. For instance, the brake-band, which may or may not be flexible, might be urged directly against the hub without the interposition of the collar 6, the pawl-and-ratchet mechanism intermediate of the sprocket-wheel and hub might be transposed, or the frictional drum and band might also be transposed. I therefore desire to reserve to myself the right to make such changes, modifications, or variations as may come properly within the scope of the protection prayed.

What I claim is—

1. In a brake, the combination with a relatively-fixed part and a wheel-hub, of a driving-wheel mounted upon the hub, mechanism intermediate of the hub and wheel arranged to operatively connect said parts only when the driving-wheel is driven in one direction, a brake-band carried by the fixed element, and partially encircling the hub and adapted to oppose a resistance to the rotation of said hub, and mechanism carried by the driving-wheel arranged to operatively engage the free end of the brake-band, only when the driving-wheel is driven independently of the hub, substantially as specified.

2. In a brake the combination with a relatively-fixed part and a wheel-hub of a driving-wheel mounted upon the hub, pawl-and-ratchet mechanism intermediate of the hub and wheel designed to operatively connect said parts only when the driving-wheel is driven in one direction, a friction-drum mounted upon the hub, a brake-band carried by the fixed element and partially encircling the drum and a catch carried by the driving-wheel and arranged to engage the free end of the brake-band only when the driving-wheel is driven independently of the hub, substantially as specified.

3. In a brake the combination with driving and driven elements, of a brake-band in operative relation to the driven element provided with a slot adjacent to its free extremity and a catch carried by the driving element designed to engage in the slot of the brake-band when moved in one direction and to avoid engagement therewith when moved in the opposite direction, substantially as specified.

4. The combination with a fixed element and a wheel-hub, of a slotted brake-band secured at one end to the fixed element and partially encircling the hub, a driving-wheel, pawl-and-ratchet mechanism intermediate of the hub and wheel, an annular flange projecting from one face of the driving-wheel and a catch projecting from the inner face of the flange and designed when moved in one direction to engage a slot in the free end of the brake-band, substantially as specified.

5. The combination with a fixed part and hub, of a driving-wheel mounted upon the hub, intermediate pawl-and-ratchet mechanism, an annular flange projecting from one side of the driving-wheel and provided upon its inner face with a catch, a dust-case carried by the fixed part and comprising a disk and an annular flange extending therefrom and encircling the flange upon the driving-wheel, a friction-drum carried by the hub, a stud projecting from the disk of the dust-case, a friction-band secured at one end to said stud and partially encircling the drum, said brake-band provided with an aperture designed to be engaged by the catch when the driving-wheel is operated independently of the hub, substantially as specified.

6. In a brake mechanism for velocipedes and the like, a member rotatable with the wheel, an annular plate secured to a relatively-fixed portion of the machine, a resilient brake-band supported upon said plate and partially encircling but normally out of engagement with the said rotatable member, a driving mechanism having direct and reverse movement for rotating the wheel during said direct movement and a projection on the driving member arranged to engage a part on said brake-band lying in the path of said projection and apply the brake to said rotatable member by said reverse movement of said driving mechanism, substantially as described.

In testimony whereof I affix my signature in presence of two witnesses.

WILLIAM EARL HENRY.

Witnesses:
F. D. BLACKISTONE,
LOUIS G. JULIAN.